(12) United States Patent
Graf et al.

(10) Patent No.: US 6,693,145 B2
(45) Date of Patent: Feb. 17, 2004

(54) EPDM COMPOUNDS FOR DYNAMIC APPLICATIONS

(75) Inventors: Hans-Joachim Graf, Stratford (CA); Yuding Feng, Stratford (CA)

(73) Assignee: Cooper Technology Services, LLC, Findlay, OH (US)

( * ) Notice: Subject to any disclaimer, the term of this patent is extended or adjusted under 35 U.S.C. 154(b) by 68 days.

(21) Appl. No.: 09/943,606

(22) Filed: Aug. 30, 2001

(65) Prior Publication Data

US 2003/0149147 A1 Aug. 7, 2003

(51) Int. Cl.[7] .............................. C08J 5/10; C08K 3/04; C08L 23/16
(52) U.S. Cl. .................. 524/495; 524/496; 524/474
(58) Field of Search ................... 524/495, 496, 524/474

(56) References Cited

U.S. PATENT DOCUMENTS

| 4,882,387 | A |   | 11/1989 | Tobing |
|---|---|---|---|---|
| 5,030,694 | A | * | 7/1991 | Kelley ..................... 525/194 |
| 5,446,097 | A |   | 8/1995 | Nonaka et al. |
| 5,610,217 | A |   | 3/1997 | Yarnell et al. |
| 5,710,218 | A |   | 1/1998 | Nakahama et al. |
| 5,973,017 | A | * | 10/1999 | Okita et al. ................. 521/140 |
| 6,028,137 | A |   | 2/2000 | Mahmud et al. |

FOREIGN PATENT DOCUMENTS

JP           1272645    * 10/1989

* cited by examiner

Primary Examiner—James J. Seidleck
Assistant Examiner—U. K. Rajguru
(74) Attorney, Agent, or Firm—Fay, Sharpe, Fagan, Minnich & McKee, LLP

(57) ABSTRACT

Vulcanized ethylene-propylene-diene (EPDM) rubbers are disclosed that are particularly suited for use in dynamic applications as a replacement for natural rubber parts. The ethylene-propylene-diene rubbers exhibit excellent thermal and oxidative resistance while displaying tensile strength and dynamic fatigue resistance comparable to similar compounds based on natural rubber. The ethylene-propylene-diene rubbers comprise a high molecular weight EPDM, a processing oil, a carbon black, and a cure system containing sulfur, tetramethylthiuram-disulfide and 2-mercaptobenzothiazole.

11 Claims, No Drawings

EPDM COMPOUNDS FOR DYNAMIC APPLICATIONS

BACKGROUND OF THE INVENTION

1. Field of the Invention

The present invention relates to elastomer rubbers for use in dynamic applications as a replacement for natural rubber parts, particularly in engine mount applications. More particularly, the present invention pertains to EPDM rubbers exhibiting tensile and tear strength comparable to natural rubber while maintaining excellent weather, ozone and thermal resistance for use in articles subjected to dynamic loading.

2. Discussion of the Art

Ethylene-$\alpha$-olefin-diene rubbers, particularly ethylene-propylene-diene (EPDM) rubbers, are excellent all-purpose rubbers that are useful in a wide variety of applications, including the manufacture of hoses, seals and weather strips. As used herein, rubber is defined to mean a material that is capable of recovering from large deformations quickly and forcibly and is essentially insoluble in solvents. EPDM rubber is a rubber made up of ethylene and propylene repeating units with a smaller amount of diene units to effect crosslinking of the polymer chains. Due in part to the substantial absence of unsaturation in the polymer backbone, EPDM rubbers exhibit superior oxidative and ozone resistance, weather resistance and heat resistance compared to conjugated diene rubbers. In addition, EPDM rubbers compare favorably in cost to other elastomers and maintain their properties across a broad range of filler concentrations.

Dynamic applications are those applications in which fabricated parts are subjected to repeated stress forces and dynamic loading. EPDM rubbers are known to exhibit relatively poor dynamic fatigue resistance, wear resistance and tensile strength and are therefore not generally used in those applications subjected to dynamic loading. These types of parts are instead manufactured using elastomers with superior dynamic mechanical properties such as natural rubber, styrene-butadiene rubber, polychloroprene and blends thereof.

While these polymers provide acceptable performance and exhibit good processability, it would be highly desirable to develop an EPDM rubber that exhibited sufficient dynamic mechanical endurance to allow it to be used in various dynamic applications. Toward this end, EPDM has been blended with other elastomers in an effort to develop a rubber with increased dynamic mechanical properties that retains the oxygen, ozone and heat resistance of EPDM while maintaining or reducing the cost of the final composition. These elastomers have included conjugated diene rubbers and polychloroprene. The effectiveness of these compounds is restricted by the fact that the proportion of EPDM that may be utilized is fairly limited in order to produce a compound with acceptable mechanical properties. In addition, the processing of such compounds is often troublesome and expensive.

For instance, the conditions necessary for acceptable curing of EPDM and other elastomers that may be used often conflict. The cure incompatibility of EPDM and highly unsaturated diene rubbers is demonstrated by the poor performance of the resulting composition in stress-strain tests. In fact, such compositions generally perform worse than either pure polymer. This poor performance is due in part to several factors. One cause of this incompatibility is the difference in vulcanization rates. Optimal vulcanization for one of the rubbers will generally lead to poor vulcanization of the other. This, combined with the preference of various accelerators for one polymer over the other, makes it difficult to achieve satisfactory vulcanization for both polymers. A second factor that contributes to poor vulcanization is the difficulty in achieving uniform dispersion among the two rubbers. Significantly different solubility parameters produce poor compatibility between rubbers, resulting in difficulty when attempting to mix such rubbers to a uniform dispersion. This produces an inhomogenous product with irregular and non-uniform properties. Traditional compatibilizers such as terpene resins and surface activated low molecular weight polymers have not been effective in mitigating this incompatibility.

In another approach, various additives have been mixed with EPDM in an effort to increase its tensile strength and fatigue resistance. Increasing the amount of reinforcing filler and peroxide has been shown to increase both hardness and modulus of the final rubber. However, the increase of filler has also been shown to correspondingly decrease the dynamic flex fatigue resistance of the resulting product. Furthermore, high levels of peroxide may decrease the tear strength of the final product. Various metal salts of acrylic acids as well as metal salts of $\alpha$-$\beta$-unsaturated organic acids have also been added to EPDM in attempts to increase the wear resistance, tensile strength and modulus of the elastomer under dynamic loading conditions. All of these methods require additional expense or are at least relatively difficult to process. Therefore, a need remains for an EPDM rubber suitable for dynamic applications which exhibits superior tensile and tear strength while maintaining weather, heat, oxygen and ozone resistance as well as ease of processing and moderate cost.

BRIEF SUMMARY OF THE INVENTION

The present invention provides ethylene-propylene-diene rubbers for use in dynamic applications, which exhibit a good balance between high mechanical strength and high dynamic fatigue strength. The rubbers display tear strength and other physical and dynamic properties comparable to similar compounds based on natural rubber while maintaining the excellent oxidative and thermal resistance of EPDM rubber.

Preferably, The EPDM rubbers of the present invention comprise a high molecular weight EPDM with a broad molecular weight distribution, about 20 to about 50 phr of a processing oil, about 10 to about 80 phr of a carbon black and a cure system comprising sulfur, tetramethylthiuram disulfide (TMTD), and 2-mercaptobenzothiazole (MBT).

In addition, the preferred EPDM rubbers may also contain conventional EPDM additives such as fillers, extenders, plasticizers, oils, waxes and pigments in such amounts that do not detract from the properties of the compound.

There are several characteristics associated with the preferred EPDM rubbers in accordance with the present invention. The EPDM rubbers should have a very high molecular weight, an ethylene content of about 65% to about 75%, which allows the possibility of crystallization under shear stress as a self-reinforcing effect like that of natural rubber, and broad molecular weight distribution to ease the incorporation of carbon black, which is important in achieving good tear strength.

The preferred vulcanized EPDM rubbers of the present invention are obtained by processing the composition and curing the rubber under time and temperature conditions necessary for optimum vulcanization.

DETAILED DESCRIPTION OF THE PREFERRED EMBODIMENTS

The present invention provides ethylene-propylene-diene rubbers for use in dynamic applications, which exhibit a desirable balance between high mechanical strength and high dynamic fatigue strength while maintaining the excellent thermal and oxidative resistance of conventional EPDM rubbers. The preferred rubbers according to the present invention display tear strength comparable to similar compounds based on natural rubber. The preferred EPDM rubbers of the present invention comprise an oil-extended, high molecular weight EPDM, carbon black in a concentration of about 10 to about 80 phr (part per hundred resin), and a curing system comprised of sulfur/TMTD/MBT.

The high molecular weight EPDM used in the preferred rubbers may comprise various monomers. While EPDM is used herein as an example, it should be appreciated that the invention includes the use of almost any high molecular weight ethylene-α-olefin-diene terpolymer. Thus, in addition to propylene, suitable α-olefins for use in the present invention are designated by the formula $CH_2=CHR$, where R is a hydrogen or alkyl of 1 to 12 carbon atoms. Examples of suitable α-olefins include, but are not limited to, propylene, isobutylene, 1-butene, 1-pentene and 1-octene. A particularly preferred α-olefin is propylene. The diene in the high molecular weight EPDM can be any of a number of compounds including, but not limited to, nonconjugated dienes such as 1,4-pentadiene, 5-ethylidene-2-norbornene, cyclopentadiene, cyclohexadiene, and 5-butylidene-2-norbornene as well as other straight chain, cyclic and bridged cyclic dienes. A particularly preferred diene is 5-ethylidene-2-norbornene.

The high molecular weight EPDM used in the present invention preferably has an ethylene content ($C_2\%$) of from about 60% to about 80% by weight, a diene content of from about 1% to about 10% by weight and an α-olefin content of from about 20% to about 40% by weight, based on the total weight of the polymer. The high molecular weight EPDM may be oil extended. Preferably, the high molecular weight EPDM has a weight average molecular weight ($M_w$) of about 180,000 to about 250,000, a polydispersity of about 2.4 to about 3.5 and a Mooney viscosity (ML (1+4) 125° C.) of about 80 to about 110. Most preferably, the high molecular weight EPDM has an ethylene content of from about 65% to about 75% by weight, a diene content of from about 2% to about 6% by weight, an α-olefin content of 20% to about 35% by weight, a $M_w$ of about 200,000 to about 220,000, a polydispersity of about 2.6 to about 3.0, a Mooney viscosity of about 85 to about 100 and is oil extended with about 15 to about 25 phr oil. A preferred high molecular weight EPDM in accordance with the present invention that is commercially available is Mega 7265, available from Union Carbide.

The EPDM rubbers of the present invention are preferably cured using sulfur, a sulfur donor, and/or one or more cure accelerators. However, other cure systems are also contemplated by the invention. Examples of suitable sulfur donors and accelerators include, but are not limited to, tetramethylthiuram disulfide (TMTD), dipentamethylenethiuram tetrasulfide (DPTT), 2-mercaptobenzothiazole (MBT), 2-mercaptobenzothiazolate disulfide (MBTS), zinc-2-mercaptobenozothiazolate (ZMBT), zinc diethyldithiocarbamatezinc (ZDEC), zinc dibutyldithiocarbamate (ZDBC), dipentamethylenethiuram tetrasulfide (DPTT), and N-t-butylbenzothiazole-2-sulfanamide (TBBS). A preferred cure system includes a combination of sulfur, MBT and TMTD. Suitable accelerators for use in the present invention are available from St. Lawrence Co.

The sulfur and/or sulfur donor is preferably used in a range from about 0.1 to about 5 phr. The accelerator(s) are used in a range from about 0.1 phr to about 5 phr. Preferably, a cure system comprising a combination of sulfur/TMTD/MBT in a phr concentration ratio of about 1.0/0.8/0.4 is used.

The processing oil utilized in accordance with the present invention can be any oil that is conventionally used in EPDM rubber manufacture. Suitable oils include, but are not limited to, naphthenic oil and paraffinic oil. A preferred processing oil is paraffinic oil. A suitable paraffinic oil is Flexon 815, available from Imperial Oil Company. The oil is preferably used in a range of from about 20 to about 50 phr.

The preferred EPDM rubbers may also include carbon black. Preferably, the EPDM rubbers of the present invention contain carbon black in the amount of from about 10 phr to about 80 phr. More preferably, the concentration of carbon black in the EPDM rubbers of the present invention is about 20 phr to about 60 phr.

In addition to the high molecular weight EPDM, the carbon black and the cure system components, the EPDM rubbers produced according to the invention may contain various other ingredients in amounts that do not detract from the properties of the resultant composition. These ingredients can include, but are not limited to, activators such as calcium or magnesium oxide; fatty acids such as stearic acid and salts thereof; fillers and reinforcers such as calcium or magnesium carbonate, silica, aluminum silicates, and the like; plasticizers and extenders such as dialkyl organic acids, naphthalenic and paraffinic oils and the like; antidegradants; softeners; waxes; and pigments.

The high molecular weight EPDM, along with the various curatives, accelerators and other components, is mixed using standard equipment and techniques known in the industry for a temperature and time necessary to obtain a uniform mixing. The blends may be accelerated on a mill and cured under typical vulcanization temperatures and time conditions. A preferable cure cycle is for 22 minutes at 310° F.

Testing Results

Various experimental trials were conducted to evaluate different EPDM rubbers for dynamic application use in engine mounts. The goal was to develop an EPDM rubber exhibiting high tensile and tear strength while maintaining a low loss factor (tan δ), which corresponds to a high dynamic fatigue resistance. The work included the evaluation of: (1) different grades of EPDM; (2) different carbon blacks; (3) different accelerators; (4) different levels of filler and oil loading; and (5) different sulfur/accelerator ratios.

The following examples are presented for the purpose of further illustrating the nature of the present invention and are not intended as a limitation of the scope thereof. It should be appreciated that the present invention is in no way restricted to the following examples.

For all trials measuring part performance, a single standard test part was used. That part was a prototype engine mount. For all part performance trials, the part was transfer molded at 310° F. for 22 minutes.

Various EPDM based rubber compositions were prepared. Table 1 lists all the ingredients used in the various trials, the identity of the respective compound and their manufacturer and/or supplier.

TABLE 1

Summary of Ingredients

| Ingredient | Compound Identity | Supplier |
|---|---|---|
| Keltan DE304 | EPDM | DSM |
| Vistalon 8800 | EPDM | ExxonMobil |
| Esprene 5216 | EPDM | Sumitomo |
| Mega 7265 | EPDM | Union Carbide |
| Mega 9315 | EPDM | Union Carbide |
| Flexon 815 | paraffinic oil | Imperial Oil Co. |
| TMTD - 80 | 80% tetramethylthiuram-disulfide | St. Lawrence |
| MBT - 80 | 80% 2-mercaptobenzothiazole | St. Lawrence |
| MBTS - 80 | 80% 2,2'-dithiobisbenzothiazole | St. Lawrence |
| TBBS - 80 | 80% N-t-butylbenzothiazole-2-sulfenamide | St. Lawrence |
| ZDBC - 80 | 80% zinc dibutyldithiocarbamate | St. Lawrence |
| Duralink HTS | Sodium hexamethylene-1,6-bisthiosulfate dihydrate | Flexsys |
| Carbon Black N990 | carbon black | Cancarb |
| Carbon Black N774 | carbon black | Cabot |
| Carbon Black N650 | carbon black | Cabot |
| Carbon Black N330 | carbon black | Cabot |

Various processing, physical and dynamic mechanical properties were measured. The tested properties in the various trials were measured in accordance with the following test methods listed in Table 2.

TABLE 2

Test Methods Used in Experimental Examples

| Property | Units | Test Procedure |
|---|---|---|
| Mooney Viscosity (MV) | Mooney Units | ASTM D1646 |
| T5 (5% rise from min. viscosity) | minutes | |
| $M_L$ (Minimum torque) | lbs/inch | ASTM D2084 |
| $M_H$ (Maximum torque) | lbs/inch | |
| $T_s2$ (Time to 1 dN · m rise above $M_L$) | minutes | |
| T90 (Time to 90% of maximum torque) | minutes | |
| Tensile strength | MPa | ASTM D412 |
| Elongation | percent (%) | |
| Modulus | MPa | |
| Tear strength | KN/m | ASTM D624 |
| Compression Set | percent (%) | ASTM D395 |
| Hardness | Shore A | ASTM D2240 |
| E* (Complex modulus) | MPa | SAE J1085a |
| E' (Storage modulus) | MPa | ASTM D2231 |
| E" (Loss modulus) | MPa | ISO 2856 |
| tan δ (Loss tangent) | — | |
| Stiffness | KN/mm | |
| Loss energy | gm/sec. | |
| $K_s$ (Static rate) | N/mm | |
| $K_d$ (Dynamic rate) | N/mm | |
| Damping Coefficient | (Ns/mm) | |
| Fatigue Life | cycles | |

Effect of Loading and Sulfur on EPDM Part Properties

To evaluate the effect of carbon black, oil and sulfur on the processing, physical and dynamic properties of EPDM rubber, compounds were mixed in a lab scale mixer according to the following formulation listed in Table 3. The concentration of components in the following examples are in phr (parts per hundred resin) unless otherwise stated.

TABLE 3

Formulation of EPDM Compounds to Determine Effect of Loading and Sulfur on Compound Properties

| Ingredient | PHR |
|---|---|
| Vistalon 8800 | 115 |
| Zinc Oxide | 5 |
| Stearic acid | 1 |
| Carbon black N774 | 40–80 |
| Flexon 815 (oil) | 50–60 |
| Sulfur - 85 | 0.6–1.8 |
| MBT - 80 | 0.420 |
| TMTD - 80 | 1.090 |

The concentrations of carbon black, oil and sulfur were varied in the amounts specified above to determine their effect on selected processing, physical and dynamic properties of the resulting EPDM rubbers. Table 4 summarizes the effect that varying the concentration of the three ingredients has on the selected properties.

TABLE 4

Summary of Effect of Oil, Carbon Black and Sulfur on EPDM Rubber Properties

| Ingredient | Processing Properties | | | | Physical Properties | | | Dynamic Properties | | | |
|---|---|---|---|---|---|---|---|---|---|---|---|
| | MV | $M_L$ | $M_H$ | T90 | Tensile Strength | Tear Strength | Modulus @ 100% | E* | E' | E" | Tan δ |
| Carbon black N774 | + | + | + | − | + | + | + | + | + | + | + |
| Flexon 815 | − | − | − | + | − | − | − | − | − | − | |
| Sulfur - 85 | − | − | + | − | − | − | + | + | + | − | − |

"+" = Property Improved
"−" = Property Degraded

From Table 4, it can be seen that low oil, high carbon and low sulfur content leads to beneficial dynamic mechanical properties. As noted earlier, a goal of the present invention is to obtain an EPDM rubber exhibiting high tensile and tear strength while maintaining a low tan δ. When the amount of sulfur and carbon black is kept constant at 0.6 and 50 phr, respectively, it was that the amount of oil should be kept low for optimum results. This clearly from the test results in Table 5.

TABLE 5

Effect of Oil Loading on EPDM Rubber Properties

| Oil Loading (phr) | Tensile Strength (MPa) | Tear Strength (MPa) | Tan δ |
|---|---|---|---|
| 20 | 13.6 | 27.1 | 0.1079 |
| 30 | 10.5 | 25.1 | 0.1124 |
| 40 | 12.4 | 23.5 | 0.1158 |

It was discovered that if the oil and sulfur concentrations are maintained constant at 0.6 and 40 phr, respectively, while increasing the carbon black loading, mechanical strength will increase slightly, but at the expense of an increase of tan δ. The results are shown in Table 6.

TABLE 6

Effect of Carbon Black Loading on EPDM Rubber Properties

| Carbon Black Loading (phr) | Tensile Strength (MPa) | Tear Strength (MPa) | Tan δ |
|---|---|---|---|
| 50 | 12.4 | 23.5 | 0.1158 |
| 60 | 14.4 | 25.3 | 0.1250 |
| 70 | 14.3 | 27.9 | 0.1425 |

Evaluation of Different Grades of EPDM

Theoretically, rubbers made from higher molecular weight EPDM will exhibit higher tensile and tear strengths than those made from lower molecular weight EPDM. Thus, rubbers made from five grades of high molecular weight EPDM were evaluated. The properties of these EPDM's are listed in Table 7.

TABLE 7

Properties of Selected EPDM's

| | Keltan DE304 | Vistalon 8800 | Esprene 5216 | Mega 7265 | Mega 9315 |
|---|---|---|---|---|---|
| Manufacturer | DSM | ExxonMobil | Sumitomo | Union Carbide | Union Carbide |
| Mooney ML(1 + 4) 125° C. | 74 | 69 | 99 | 92 | 115 |
| Ethylene Content (%) | 61 | 54 | 54 | 67.5 | 64.5 |
| ENB Content (%) | 7.7 | 10 | 7.5 | 4 | 3.5 |
| $M_n$ | NA | 39,500 | NA | 75,000 | 73,000 |
| $M_w$ | 289,000 | 113,000 | 350,000 | 210,000 | 277,500 |
| Polydispersity | NA | 2.86 | NA | 2.80 | 3.80 |

Table 8 shows the formulations used in the manufacture of various EPDM rubbers utilizing certain high molecular weight EPDM's. All concentrations are in phr unless otherwise noted.

TABLE 8

Formulations of EPDM Rubbers

| | Sample | | | | |
|---|---|---|---|---|---|
| Ingredient | A | B | C | D | E |
| Keltan DE304 | 175 | — | — | — | — |
| Vistalon 8800 | — | 115 | — | — | — |
| Esprene 5216 | — | — | 100 | — | — |
| Mega 7265 | — | — | — | 119 | — |
| Mega 9315 | — | — | — | — | 120 |
| Zinc Oxide | 5 | 5 | 5 | 5 | 5 |
| Stearic acid | 2 | 2 | 2 | 2 | 2 |
| Carbon black N774 | 60 | 50 | 45 | 30 | 30 |
| Flexon 815 | 5 | 30 | 30 | 30 | 30 |
| Curatives | | | | | |
| Sulfur - 85 | 1.20 | 0.60 | 0.60 | 0.60 | 0.60 |
| TMTD - 80 | 1.20 | 1.09 | 1.09 | 1.09 | 1.09 |
| MBT - 80 | 0.42 | 0.42 | 0.42 | 0.42 | 0.42 |

The resulting rubbers were processed and cured according to the previously described conditions. Physical testing was performed both before and after heat aging the parts for 70 hours at 100° C. Physical properties of the various EPDM rubbers are listed in Table 9.

TABLE 9

Physical Properties of Samples in EPDM Trials

| Property | A | B | C | D | E |
|---|---|---|---|---|---|
| Tensile Strength (MPa) | 7.8 | 13.6 | 16.5 | 22.7 | 20.2 |
| Elongation (%) | 393 | 555 | 581 | 636 | 584 |
| Modulus @ 100% (MPa) | 1.2 | 1.3 | 1.4 | 1.9 | 1.8 |
| Hardness (Shore A) | 49 | 60 | 53 | 61 | 59 |
| Tear Strength ((KN/m) | 20.9 | 27.1 | 30.3 | 39.6 | 39.5 |
| Compression Set after 22 hr. @ 100° C. (%) | 11.7 | 11.2 | 15.5 | 17.8 | 14.6 |
| Heat aged 70 hours at 100° C. | | | | | |
| Tensile strength change (%) | −16.7 | −17.6 | −7.9 | 4 | −6.4 |
| Elongation change (%) | −36.9 | −11.2 | −10.5 | −6.9 | −15.1 |

The dynamic mechanical properties of these rubbers were also measured according to the respective ASTM standards by MER (Mechanical Energy Resolver), a dynamic mechanical tester available from Instrumentors, Inc. Sample A displayed such poor physical properties that the dynamic mechanical properties were not tested. The results are displayed in Table 10.

TABLE 10

Dynamic Mechanical Properties of Samples in EPDM Trials

| Property | B | C | D | E |
|---|---|---|---|---|
| E* (MPa) | 4.3544 | 5.0310 | 8.6850 | 6.5403 |
| E' (MPa) | 4.3291 | 4.9880 | 8.6423 | 6.4820 |
| E" (MPa) | 0.4669 | 0.6578 | 0.8623 | 0.8700 |
| Tan δ | 0.1079 | 0.1319 | 0.0998 | 0.1342 |
| Stiffness (KN/mm) | 4.2580 | 4.7168 | 9.2665 | 6.2292 |
| Loss Energy | 9.4757 | 10.4658 | 4.0419 | 8.0410 |

The use of Mega 7265 led to the EPDM rubber exhibiting the best combination of physical and dynamic mechanical properties. Therefore, further testing used Mega 7265 as the high molecular weight EPDM component.

Evaluation of Different Grades of Carbon Black

Four grades of carbon black were evaluated. Table 11 lists the supplier and characteristics of each grade.

TABLE 11

Properties of Selected Carbon Blacks

| | N990 | N774 | N650 | N330 |
|---|---|---|---|---|
| Supplier | Cancarb | Cabot | Cabot | Cabot |
| Iodine Adsorption (g/kg) (ASTM D1510) | N/A | 29 | 36 | 82 |
| DBP (dibutyl phthalate absorbtion) ($10^{-5}$ m$^3$/kg) (ASTM D2414) | 43 | 72 | 122 | 102 |

Table 12 lists the formulations for several EPDM rubber compositions that were used to evaluate the effect of the carbon black grade on the resulting properties of the EPDM rubber. All concentrations are in phr.

TABLE 12

Formulation of Samples in Carbon Black Trials

| | Sample | | | |
|---|---|---|---|---|
| Ingredient | A | B | C | D |
| EPDM (Mega 7265) | 119 | 119 | 119 | 119 |
| Zinc Oxide | 5 | 5 | 5 | 5 |
| Stearic acid | 2 | 2 | 2 | 2 |
| N990 | 37 | — | — | — |
| N774 | — | 30 | — | — |
| N650 | — | — | 23 | — |
| N330 | — | — | — | 15 |
| Flexon 815 | 30 | 30 | 30 | 30 |
| Curatives | | | | |
| Sulfur - 85 | 0.60 | 0.60 | 0.60 | 0.60 |
| TMTD - 80 | 1.09 | 1.09 | 1.09 | 1.09 |
| MBT - 80 | 0.42 | 0.42 | 0.42 | 0.42 |

Physical and dynamic mechanical testing were also performed on the resulting EPDM rubbers. The dynamic mechanical properties were measured by MER (Mechanical Energy Resolver). The results are listed in Table 13.

TABLE 13

Physical and Dynamic Mechanical Properties of Test Samples in Carbon Black Trials

| Property | A (N990) | B (N774) | C (N650) | D (N330) |
|---|---|---|---|---|
| Tensile Strength (MPa) | 21.0 | 22.7 | 25.3 | 22.0 |
| Elongation (%) | 637 | 636 | 646 | 591 |
| Modulus @ 100% (MPa) | 1.9 | 1.9 | 1.9 | 1.9 |
| Hardness (ShA) | 62 | 61 | 61 | 62 |
| Tear Strength (KN/m) | 39.2 | 39.6 | 45.0 | 40.2 |
| Compression set (%) | 20.7 | 17.8 | 18.7 | 18.2 |
| Tensile strength change after heat aged for 70 hr. at 100° C. (%) | 6.2 | 4.0 | -3.2 | -14.1 |
| Elongation change after heat aged for 70 hr. at 100° C. (%) | -5.3 | -6.9 | -7.9 | -12.2 |
| E* (MPa) | 9.6818 | 8.6850 | 10.0454 | 8.7990 |
| E' (MPa) | 9.6280 | 8.6423 | 9.9810 | 8.7558 |
| E" (MPa) | 1.0190 | 0.8623 | 1.1305 | 0.8688 |
| Tan δ | 0.1058 | 0.0998 | 0.1143 | 0.0993 |
| Stiffness (KN/mm) | 9.0755 | 9.2665 | 9.4144 | 8.2610 |
| Loss Energy | 4.3567 | 4.0419 | 4.4402 | 4.4990 |

As previously noted, prototype engine mounts were formed. Part performance was measured using MTS (Mechanical Test System), a dynamic mechanical tested designed for use in vibration tests for vehicle rubber parts and available from Instron Inc. Results are displayed in Table 14.

TABLE 14

Part Performance (-2600 N ± 3G forced vibration range)

| Property | A (N990) | B (N774) | C (N650) | D (N330) |
|---|---|---|---|---|
| $K_s$ (N/mm) | 1088 | 1081 | 1170 | 1026 |
| $K_d$ (N/mm) | 1509 | 1470 | 1597 | 1384 |
| $K_d/K_s$ | 1.39 | 1.36 | 1.36 | 1.35 |
| Damping Coefficient (Ns/mm) | 1.5708 | 1.5316 | 1.7971 | 1.3727 |
| Tan δ | 0.0982 | 0.0983 | 0.1063 | 0.0936 |
| Fatigue Life @ room temp. | 32,817 | 10,027 | 14,843 | 11,747 |
| Fatigue Life @ 250° C. | 4,268 | 10,630 | 5,897 | 4,313 |

From the test results, the N774 carbon black produced the rubber exhibiting the best overall combination of good mechanical properties, compression set, heat aging properties, dynamic properties and fatigue life at high temperatures.

Effect of Different Accelerators

Five different accelerators were studied to determine their effect on the properties of the resultant EPDM rubbers. Table 15 shows the various formulations used in these trials. All concentrations are in phr.

TABLE 15

Formulation of Test Samples in Accelerator Trials

| | Sample | | | | |
|---|---|---|---|---|---|
| Ingredient | A | B | C | D | E |
| EPDM Vistalon 8800 | 115 | 115 | 115 | 115 | 115 |
| Zinc oxide | 5 | 5 | 5 | 5 | 5 |
| Stearic acid | 1 | 1 | 1 | 1 | 1 |
| Carbon black N774 | 80 | 80 | 80 | 80 | 80 |

TABLE 15-continued

Formulation of Test Samples in Accelerator Trials

| Ingredient | A | B | C | D | E |
|---|---|---|---|---|---|
| Flexon 815 | 55 | 55 | 55 | 55 | 55 |
| Curatives | | | | | |
| Sulfur - 85 | 3.0 | 3.0 | 3.0 | 3.0 | 3.0 |
| TMTD - 80 | 1.00 | — | — | — | — |
| MBT - 80 | — | 0.70 | — | — | — |
| MBTS - 80 | — | — | 1.38 | — | — |
| TBBS - 80 | — | — | — | 0.99 | — |
| ZDBC - 80 | — | — | — | — | 1.85 |

Table 16 shows the cure rate and processing parameters exhibited by the different samples.

TABLE 16

Cure Rate and Processing Properties Exhibited by Samples in Accelerator Trials

| Property | A (TMTD) | B (MBT) | C (MBTS) | D (TBBS) | E (ZDBC) |
|---|---|---|---|---|---|
| MV | 30.5 | 31.6 | 30.8 | 30.6 | 31.2 |
| T5 (min) | 23.79 | >30 | >30 | >30 | 8.82 |
| ML (lb-in) | 0.74 | 0.76 | 0.74 | .075 | 0.75 |
| MH (lb-in) | 12.52 | 10.48 | 12.57 | 12.63 | 11.47 |
| Ts2 (min) | 1.28 | 2.03 | 2.58 | 2.60 | 0.98 |
| T90 (min) | 9.48 | 20.15 | 20.51 | 14.92 | 16.28 |

As can be seen, TMTD produces the rubber exhibiting the fastest cure rate (9.48 min) while ZDBC is not acceptable because T5 is too short, resulting in premature scorch and poor parts quality.

The physical properties of the resulting EPDM rubbers were tested and the results are listed in Table 17. It can be seen that MBT produces the rubber providing the best mechanical properties while TMTD provides the best compression set and good heat aging properties.

TABLE 17

Physical Properties of Samples in Accelerator Trials

| Property | A (TMTD) | B (MBT) | C (MBTS) | D (TBBS) | E (ZDBC) |
|---|---|---|---|---|---|
| Tensile Strength (MPa) | 9.6 | 16.2 | 14.5 | 10.9 | 10.8 |
| Elongation (%) | 368 | 701 | 632 | 466 | 400 |
| Modulus @ 100% (MPA) | 2.1 | 1.2 | 1.4 | 1.9 | 2.2 |
| Hardness (Shore A) | 55 | 50 | 50 | 52 | 55 |
| Tear Strength ((KN/m) | 25.7 | 32.6 | 32.1 | 28.6 | 27.8 |
| Comp. Set 22 hr. @ 100° C. (%) | 39.1 | 42.7 | 45.6 | 48 | 46.4 |
| Heat aged 70 hours at 100° C. | | | | | |
| Tensile strength change (%) | −4.2 | −20.4 | −26.9 | −6.4 | 12.0 |
| Elongation change (%) | −30.9 | −27.4 | −35.1 | −30.0 | −41.8 |

Based on these results, a combination of MBT and TMTD was then tested. In addition, a combination of MBTS and ZDBC and a combination of MBT and Duralink HTS were also tested. The recipes of the rubbers are listed in table 18.

TABLE 18

Formulation of Samples in Accelerator Trials

| Ingredient | A (TMTD + MBT) | B (MBTS + ZDBC) | C (MBT + Duralink) |
|---|---|---|---|
| EPDM Mega 7265 | 119 | 119 | 119 |
| Zinc oxide | 5 | 5 | 5 |
| Stearic acid | 2 | 2 | 2 |
| Carbon black N774 | 30 | 30 | 30 |
| Flexon 815 | 30 | 30 | 30 |
| Curatives | | | |
| Sulfur - 85 | 1.00 | 2.35 | 2.35 |
| TMTD - 80 | 0.80 | — | — |
| MBT - 80 | 0.40 | — | 1.25 |
| MBTS - 80 | — | 1.00 | — |
| Duralink HTS | — | — | 1.50 |
| ZDBC - 80 | — | 0.24 | — |

Table 19 shows the physical and dynamic mechanical properties of the resulting EPDM rubbers.

TABLE 19

Physical and Dynamic Mechanical Properties of Samples in Accelerator Trials

| Property | A (TMTD + MBT) | B (MBTS + ZDBC) | C (MBT + Duralink) |
|---|---|---|---|
| Tensile Strength (MPa) | 21.6 | 23.3 | 24.1 |
| Elongation (%) | 540 | 567 | 637 |
| Mod. @ 100% (MPa) | 2.3 | 2.1 | 2.1 |
| Hardness (ShA) | 65 | 65 | 65 |
| Tear Strength (KN/m) | 42.9 | 47.4 | 47.4 |
| Compression set (%) | 19.5 | 40.5 | 40.5 |
| Tensile strength change after heat aged for 70 hr. at 100° C. (%) | 2.8 | −33.4 | −8.3 |
| Elongation change after heat aged for 70 hr. at 100° C. (%) | −0.4 | −33.3 | −22.4 |
| E* (MPa) | 9.8765 | 9.5130 | 10.9600 |
| E' (MPa) | 9.8163 | 9.5100 | 10.8730 |
| E" (MPa) | 1.0890 | 1.1050 | 1.3858 |
| Tan δ | 0.1110 | 0.1164 | 0.1275 |
| Stiffness (KN/mm) | 9.2674 | 9.0251 | 10.2465 |
| Loss Energy | 4.4628 | 4.7951 | 4.6494 |

As previously noted, a prototype part was formed. Part performance was measured using MTS (Mechanical Test System). Results are displayed in Table 20.

TABLE 20

Part Performance (−2600 N ± 3G forced vibration range)

| Property | A (TMTD + MBT) | B (MBTS + ZDBC) | C (MBT + Duralink) |
|---|---|---|---|
| $K_s$ (N/mm) | 1111 | 1101 | 1148 |
| $K_d$ (N/mm) | 1522 | 1493 | 1595 |
| $K_d/K_s$ | 1.37 | 1.36 | 1.39 |
| Damping C (Ns/mm) | 1.6698 | 1.6497 | 1.9542 |
| Tan δ | 0.1036 | 0.1042 | 0.1158 |
| Fatigue Life @ room temp. | 60,616 | 24,798 | NA |
| Fatigue Life @ 250° C. | 13,663 | 4,342 | NA |

The combination of TMTD and MBT produced the rubber exhibiting the best combination of good tensile strength, good heat aging properties, low compression set and long part life.

Effect of Sulfur/Accelerator Ratio

There are three generally recognised classifications for sulfur vulcanization: (1) conventional systems containing high sulfur/accelerator ratios; (2) efficient ("EV") systems containing low sulfur/accelerator ratios; and (3) semi-efficient ("semi-EV") systems that are intermediate between (1) and (2). These systems can be produced in rubber by varying sulfur/accelerator ratios (Table 21).

TABLE 21

Sulfur/Accelerator Concentration of Different Vulcanization Systems for Natural Rubber

| | Sulfur (phr) | Accelerators (phr) | Accel./S Ratio |
|---|---|---|---|
| Conventional | 2.0–3.5 | 1.2–0.4 | 0.1–0.6 |
| Semi-EV | 1.0–1.7 | 2.5–1.2 | 0.7–2.5 |
| EV | 0.4–0.8 | 5.0–2.0 | 2.5–12 |

The ratio of sulfur to accelerator determines the efficiency with which sulfur forms crosslinks, which depends on the nature of the crosslinks and the content of main-chain modification. The crosslinks include (a) polysulfidic (Sx); (b) disulfidic (S2) and (c) monosulfidic (S). The main-chain modifications include (d) cyclic sulfide; (e) conjugated trienes and (f) accelerator-terminated pendent group.

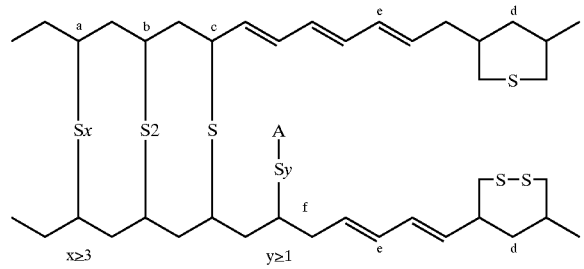

Structural Features of a Vulcanized Rubber

The proportion of monosulfidic crosslinks rises and the level of wasteful cyclic sulfides along the main chain decreases as the ratio of active accelerator to free sulfur increases. The effect of crosslinking efficiency on vulcanizate properties is illustrated in Table 22.

TABLE 22

Effect of Crosslinking Efficiency on Vulcanizate Structure and Properties

| | Conventional | Semi-EV | EV |
|---|---|---|---|
| Poly- and Di-sulfidic, % | 95 | 50 | 20 |
| Mono-sulfidic, % | 5 | 50 | 80 |
| Cyclic sulfide | High | Medium | Low |
| Low temp. crystallization resistance | High | Medium | Low |
| Heat-aging resistance | Low | Medium | High |
| Reversion resistance | Low | Medium | High |
| Comp. Set., % (22 hr, 70° C.) | 30 | 20 | 10 |

The polysulfidic crosslink is widely identified with the excellent and largely unrivalled un-aged mechanical properties of conventional sulfur vulcanizates. However, polysulfidic crosslinks are not as thermally stable as other commonly found crosslinks.

EV systems are usually recommended for products in need of improved reversion resistance during vulcanization and for products exposed far to more arduous service temperatures. The lower risk of reversion enables the more uniform vulcanization of bulky articles and allows natural rubber to withstand the very high temperatures. In an EV system monosulfidic crosslinks can account for over 80% of the total number of crosslinks at optimum cure, whereas less than 10% may be present in a conventional sulfur vulcanizate.

Different sulfur/accelerator ratios were used to investigate the effect of the sulfide bridge structure on the properties of the resultant rubber. Table 23 shows the formulations used in the trials. All concentrations are in phr.

TABLE 23

Formulation of Samples in Sulfur/Accelerator Trials

| | Sample | | | | |
|---|---|---|---|---|---|
| Ingredient | A | B | C | D | E |
| EPDM Mega 7265 | 119 | 119 | 119 | 119 | 119 |
| Zinc oxide | 5 | 5 | 5 | 5 | 5 |
| Stearic acid | 2 | 2 | 2 | 2 | 2 |
| Carbon black N774 | 30 | 30 | 30 | 30 | 30 |
| Flexon 815 | 20 | 30 | 30 | 30 | 30 |
| Curatives | | | | | |
| Sulfur - 85 | 0.60 | 1.00 | 1.80 | 2.35 | 2.94 |
| TMTD - 80 | 1.09 | 0.80 | — | — | — |
| MBT - 80 | 0.42 | 0.40 | 1.25 | 1.25 | 1.25 |

Table 24 displays the results of physical testing performed on these rubbers. Sample B displayed the best overall compression set and heat aging properties while maintaining acceptable tensile strength.

TABLE 24

Physical Properties of Samples in Sulfur/Accelerator Trials

| Property | A | B | C | D | E |
|---|---|---|---|---|---|
| Tensile Strength (MPa) | 22.7 | 21.6 | 22.6 | 23.2 | 22.8 |
| Elongation (%) | 636 | 540 | 650 | 646 | 635 |
| Modulus @ 100% (MPA) | 1.9 | 2.3 | 1.9 | 2.0 | 2.0 |
| Hardness (Shore A) | 61 | 65 | 65 | 66 | 66 |
| Tear Strength ((KN/m) | 36.6 | 42.9 | 44.8 | 44.6 | 45.4 |
| Comp. Set after 22 hr. @ 100° C. (%) | 17.8 | 19.5 | 46 | 45.4 | 47.2 |
| Heat aged 70 hours at 100° C. | | | | | |
| Tensile strength change (%) | 4 | 2.8 | −8.4 | −10.8 | −14.9 |
| Elongation change (%) | −6.9 | −0.4 | −18.6 | −19.8 | −21.6 |

As previously noted, engine mount prototype parts were molded. Table 25 lists the dynamic mechanical properties of the parts. Sample B also showed the best fatigue life.

TABLE 25

Dynamic Mechanical Properties of Samples in Sulfur/Accelerator Trials

| Property | A | B | C | D | E |
|---|---|---|---|---|---|
| $K_s$ (N/mm) | 1081 | 1111 | 1212 | 1157 | 1176 |
| $K_d$ (N/mm) | 1470 | 1522 | 1673 | 1598 | 1609 |
| $K_d/K_s$ | 1.36 | 1.37 | 1.38 | 1.38 | 1.38 |

TABLE 25-continued

Dynamic Mechanical Properties of Samples
in Sulfur/Accelerator Trials

| Property | A | B | C | D | E |
|---|---|---|---|---|---|
| Damping C (Ns/mm) | 1.5316 | 1.6698 | 2.0262 | 1.9218 | 1.9243 |
| Tan δ | 0.0983 | 0.1036 | 0.1144 | 0.1136 | 0.1130 |
| Fatigue Life @ room temp. | 10,027 | 60,616 | 11,670 | 9,708 | 13,817 |
| Fatigue Life @ 250° C. | 10,630 | 13,663 | 5,774 | 6,100 | 7,034 |

Based on the forgoing experimental trials, it was determined that both Mega 7265 and Mega 9315 impart good mechanical properties to the resultant rubber, but the dynamic properties for Mega 7265 are superior. Of the four grades of carbon black investigated, Carbon Black N774 provided the best overall mechanical properties, compression set, heat aging properties, dynamic properties and fatigue life at high temperatures in the rubbers. Of the various accelerator combinations tested, TMTD and MBT provided excellent results, with the combination of TMTD and MBT providing the best overall properties. Specifically, a sulfur/accelerator combination of sulfur/TMTD/MBT in the ratio of 1.0/0.8/0.4 phr provided the best performance. When the preceding compounds were used to produce EPDM rubber, the resulting EPDM rubbers produced exhibited a tear strength comparable to similar compounds based on natural rubber while maintaining excellent oxidative and thermal resistance superior to natural rubber.

The invention has been described with reference to various preferred embodiments. Modifications and alterations will occur to others upon a reading and understanding of the specification. The invention is intended to include all such modifications and alterations insofar as they come within the scope of the appended claims and the equivalents thereof. Thus, for example, the compositions of the present invention can be used in other applications that require high mechanical strength as well as dynamic fatigue resistance such as tires, power transmission belting, and other articles subject to dynamic loading.

What is claimed is:

1. A composition particularly adapted for use in dynamic applications comprising:
    a high molecular weight ethylene-propylene-diene (EPDM) polymer having an ethylene content of about 60% to about 80% by weight of the polymer;
    about 10 to about 60 phr of a carbon black; and
    a cure system comprising sulfur, tetramethylthiuram-disulfide, and 2-mercaptobenzothiazole, the sulfur present in the concentration of about 0.8 to about 1.2 phr and the tetramethylthiuram-disulfide present in the concentration of about 0.8 to about 1.0 phr.

2. The composition of claim 1, wherein the cure system comprises sulfur in the concentration of about 1.0 phr, tetramethythiuram-disulfide in the concentration of about 0.8 phr, and 2-mercaptobenzothiazole in the concentration of about 0.4 phr.

3. The composition of claim 1, wherein the high molecular weight EPDM has a weight average molecular weight ($M_w$) of about 180,000 to about 250,000 and a polydispersity of about 2.4 to about 3.5.

4. The composition of claim 1, wherein the high molecular weight EPDM has a Mooney viscosity (ML (1+4) 125° C.) of about 80 to about 110.

5. The composition of claim 1, wherein the high molecular weight EPDM has an ethylene content of from about 65 to about 75% by weight.

6. The composition of claim 1, wherein the high molecular weight EPDM is oil extended with about 15 to about 25 phr oil.

7. The composition of claim 1, further comprising about 20 to about 50 phr of a processing oil.

8. The composition of claim 7, wherein the processing oil is a paraffinic oil.

9. The composition of claim 1, wherein the carbon black is an N774 grade carbon black with an iodine adsorption of about 29 g/kg and a dibutyl phthalate absorbtion of about $72 \times 10^{-5}$ m$^3$/kg.

10. The composition of claim 1, wherein the ethylene-propylene-diene rubber exhibits a tensile strength of greater than 20 MPa, a compression set less than 22% after 22 hours at 100° C., and a tensile strength and elongation decrease of less than 5% after being heat aged for 70 hours at 100° C.

11. A composition particularly adapted for use in dynamic applications comprising:
    a high molecular weight EPDM polymer having an ethylene content of about 65% to about 75% by weight, a weight average molecular weight ($M_w$) of about 200,000 to about 220,000, a polydispersity of about 2.6 to about 3.0, a Mooney viscosity (ML (1+4) 125° C.) of about 85 to about 100, said high molecular weight EPDM polymer being oil extended with about 15 to about 25 phr oil;
    about 20 to about 50 phr of an N774 grade carbon black;
    about 20 to about 50 phr of a paraffinic oil; and
    a cure system comprising sulfur, tetramethylthiuram-disulfide, and 2-mercaptobenzothiazole in a concentration ratio of about 1.0/0.8/0.4 phr respectively.

* * * * *